(12) United States Patent
Kudner (10) Patent No.: US 10,334,831 B2
(45) Date of Patent: Jul. 2, 2019

(54) FISHING NET AND METHOD OF MANUFACTURING SAME

(71) Applicant: Drifter Marine, Inc., Perrysburg, OH (US)

(72) Inventor: Donald Kudner, Maumee, OH (US)

(73) Assignee: Drifter Marine, Inc., Perrysburg, OH (US)

( * ) Notice: Subject to any disclaimer, the term of this patent is extended or adjusted under 35 U.S.C. 154(b) by 0 days.

(21) Appl. No.: 14/525,380

(22) Filed: Oct. 28, 2014

(65) Prior Publication Data

US 2015/0113852 A1    Apr. 30, 2015

Related U.S. Application Data

(60) Provisional application No. 61/897,256, filed on Oct. 30, 2013.

(51) Int. Cl.
*A45B 3/00* (2006.01)
*A01K 77/00* (2006.01)

(52) U.S. Cl.
CPC .................................. *A01K 77/00* (2013.01)

(58) Field of Classification Search
CPC ...... A01K 77/00; A01K 63/006; A01K 97/20; A01K 75/00; A01K 74/00
USPC ............................................................ 43/11
See application file for complete search history.

(56) References Cited

U.S. PATENT DOCUMENTS

| 1,685,678 | A | * | 9/1928 | Mirfield | B21C 37/14 29/417 |
|---|---|---|---|---|---|
| 2,595,597 | A | * | 5/1952 | Morseth | A01K 77/00 16/429 |
| 2,783,572 | A | * | 3/1957 | Rohan | A01M 31/06 43/3 |
| 2,783,573 | A | * | 3/1957 | Rau | A01K 77/00 43/11 |
| 3,077,693 | A | * | 2/1963 | Wallin | A01K 77/00 362/109 |
| 3,173,196 | A | * | 3/1965 | Grimm | B21C 37/14 138/109 |
| 3,731,517 | A | * | 5/1973 | Johnson | B05B 1/04 29/890.08 |
| 3,742,300 | A | * | 6/1973 | Floyd | B64D 45/02 361/218 |
| 3,747,250 | A | * | 7/1973 | Willinger | A01K 77/00 43/11 |
| 4,086,875 | A | * | 5/1978 | Lindbergh | A01K 61/001 119/216 |
| 4,138,790 | A | * | 2/1979 | Schmucker | A01K 77/00 43/12 |

(Continued)

FOREIGN PATENT DOCUMENTS

JP   H0880141 A   3/1996
JP   2001161215 A   6/2001

*Primary Examiner* — Shin H Kim
(74) *Attorney, Agent, or Firm* — Marshall & Melhorn, LLC (57) ABSTRACT

A fishing net includes a hoop formed of a section of tubing bent to a loop-like configuration, the hoop defining a net opening. An elongate handle is secured to the hoop at a proximal portion thereof, and a net bag is supported on the hoop. The hoop is formed with a cross-sectional profile that varies along at least a portion of the length of the section of tubing. A method of forming a hoop for a fishing net is also provided.

16 Claims, 5 Drawing Sheets

(56) References Cited

U.S. PATENT DOCUMENTS

| | | | | |
|---|---|---|---|---|
| 4,212,126 A * | 7/1980 | Barnett | A01K 87/005 43/24 |
| 4,502,240 A * | 3/1985 | Kapucinski | A01K 63/042 43/11 |
| 4,580,324 A * | 4/1986 | Laska | B21D 41/02 29/890.049 |
| 5,276,995 A * | 1/1994 | Johnson | A01K 77/00 43/11 |
| 5,339,557 A * | 8/1994 | Brundage | A01K 77/00 43/11 |
| 5,342,513 A * | 8/1994 | Wall | E04H 4/1609 15/1.7 |
| 5,442,875 A * | 8/1995 | Brundage | A01K 77/00 43/11 |
| 5,511,777 A * | 4/1996 | McNeely | A63B 59/50 473/520 |
| 5,813,930 A * | 9/1998 | Strauther | A63B 63/083 150/154 |
| 5,875,668 A * | 3/1999 | Kobayashi | B21D 5/10 138/115 |
| 6,053,960 A * | 4/2000 | King | C21C 7/0056 29/407.04 |
| 6,112,801 A * | 9/2000 | Daniels | A47H 1/102 160/330 |
| 6,139,444 A * | 10/2000 | Renard | A63B 53/10 273/DIG. 23 |
| 6,907,706 B1 | 6/2005 | Schippmann | |
| 6,971,691 B1 * | 12/2005 | Heatherington | B60R 19/18 293/102 |
| 7,066,525 B2 | 6/2006 | Jaeger | |
| 7,124,533 B2 * | 10/2006 | Kleckner | A01K 77/00 43/11 |
| 8,491,411 B2 | 7/2013 | DeShiell | |
| 9,244,184 B2 * | 1/2016 | Voldsbekk | G01V 1/38 |
| 9,250,343 B2 * | 2/2016 | Voldsbekk | G01V 1/38 |
| 2002/0111234 A1 * | 8/2002 | MacNichol | A63B 63/00 473/446 |
| 2004/0102260 A1 * | 5/2004 | Chia | A63B 63/083 473/472 |
| 2004/0116217 A1 * | 6/2004 | Morrow | A63B 60/10 473/513 |
| 2005/0090336 A1 * | 4/2005 | Nye | A63B 61/02 473/446 |
| 2005/0192126 A1 * | 9/2005 | Remaklus | A63B 63/08 473/447 |
| 2007/0193324 A1 * | 8/2007 | Mitsukawa | B21D 53/04 72/197 |
| 2007/0240473 A1 * | 10/2007 | Taniyama | B21C 37/151 72/181 |
| 2010/0132242 A1 * | 6/2010 | Emter, Jr. | A01K 77/00 43/11 |
| 2012/0036758 A1 * | 2/2012 | Steffens | A01K 77/00 43/12 |
| 2013/0091755 A1 * | 4/2013 | Marks | A01K 77/00 43/11 |
| 2014/0157650 A1 * | 6/2014 | Blood | A01K 77/00 43/11 |
| 2015/0087907 A1 * | 3/2015 | Konstorum | A61B 1/015 600/121 |
| 2015/0113852 A1 * | 4/2015 | Kudner | A01K 77/00 43/11 |

\* cited by examiner

FISHING NET AND METHOD OF MANUFACTURING SAME

CROSS-REFERENCE TO RELATED APPLICATIONS

This application is claiming the benefit, under 35 U.S.C. § 119(e), of the provisional application filed Oct. 30, 2013 under 35 U.S.C. § 111(b), which was granted Ser. No. 61/897,256. This provisional application is hereby incorporated by reference in its entirety.

BACKGROUND OF THE INVENTION

The invention relates to fishing equipment and, more particularly, to fishing nets.

Over the years, manufacturers of fishing nets have experimented with larger net sizes to extend the use of such nets to include predator fish such as Musky, Pike and Atlantic Salmon. These fish can weigh up to 100 lbs. and thus require a landing net with significant strength. A significant disadvantage of such large nets has been that they are too heavy. This was due to the amount of material required to make a net of the appropriate size and because the larger the hoop design the greater the center of effort cantilevered out past the handle/yoke, thus requiring greater strength. The amount of material required also made such larger nets expensive to manufacture. Conventionally, larger fishing nets have been made either with thicker (and thus heavier and more costly) tubing, or have been formed of extruded tubing with structural webs in the interior of the tubing to reinforce the tubing in one direction. The combination of factors has historically limited practical fishing nets to less than 40" in length by 37" in width at the longest and widest points.

Therefore, a need exists for an improved fishing net design that allows for the manufacture of large fishing nets that are of significantly reduced weight relative to their size and are relatively inexpensive.

SUMMARY OF THE INVENTION

A fishing net in accordance with an aspect of the invention includes a hoop formed of a section of tubing bent to a loop-like configuration, the hoop defining a net opening, an elongate handle secured to the hoop at a proximal portion thereof, and a net bag supported on the hoop. The hoop is formed with a cross-sectional profile that varies along at least a portion of the length of the section of tubing.

In accordance with another aspect of the invention, a method of forming a hoop for a fishing net is provided. In the method of the invention, a section of tubing is provided that defines first and second end sections and a midsection therebetween, the section of tubing being of a circular cross-sectional profile. The midsection is shaped to have a non-circular cross-sectional profile. A first reinforcing rod is positioned in the first end section and a second reinforcing rod is positioned in the second end section. The section of tubing and the reinforcing rods are bent such that the section of tubing forms a hoop with the first end section adjacent to the second end section. A net and handle may be attached to the hoop in any suitable manner.

BRIEF DESCRIPTION OF THE DRAWINGS

The advantages of the invention will become readily apparent to those skilled in the art from the following detailed description of various embodiments when considered in the light of the accompanying drawings, in which.

DETAILED DESCRIPTION OF THE INVENTION

It is to be understood that the specific devices and processes illustrated in the attached drawings and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

The invention is a fishing net that may be made to a size large enough to allow its use with large predator and trophy fish, but still not too heavy to be handled by the typical user and relatively inexpensive to manufacture.

In an effort to devise such a fishing net, it was discovered that different parts of the hoop of the fishing net experienced significantly different stresses, both in magnitude and direction. It was further discovered that the strength of the fishing net could be maximized and its weight minimized by varying the cross-sectional profile of the hoop, rather than utilizing tubing of uniform cross-sectional profile as was conventional.

In another aspect of the invention, improvements in the strength of the fishing net relative to its weight are realized by providing a reinforcing rod in each end of the hoop that extends through an initial S-shaped portion of the respective end of the hoop, rather than to a point just past the first curve in the respective end of the hoop as is conventional.

Figure 1:
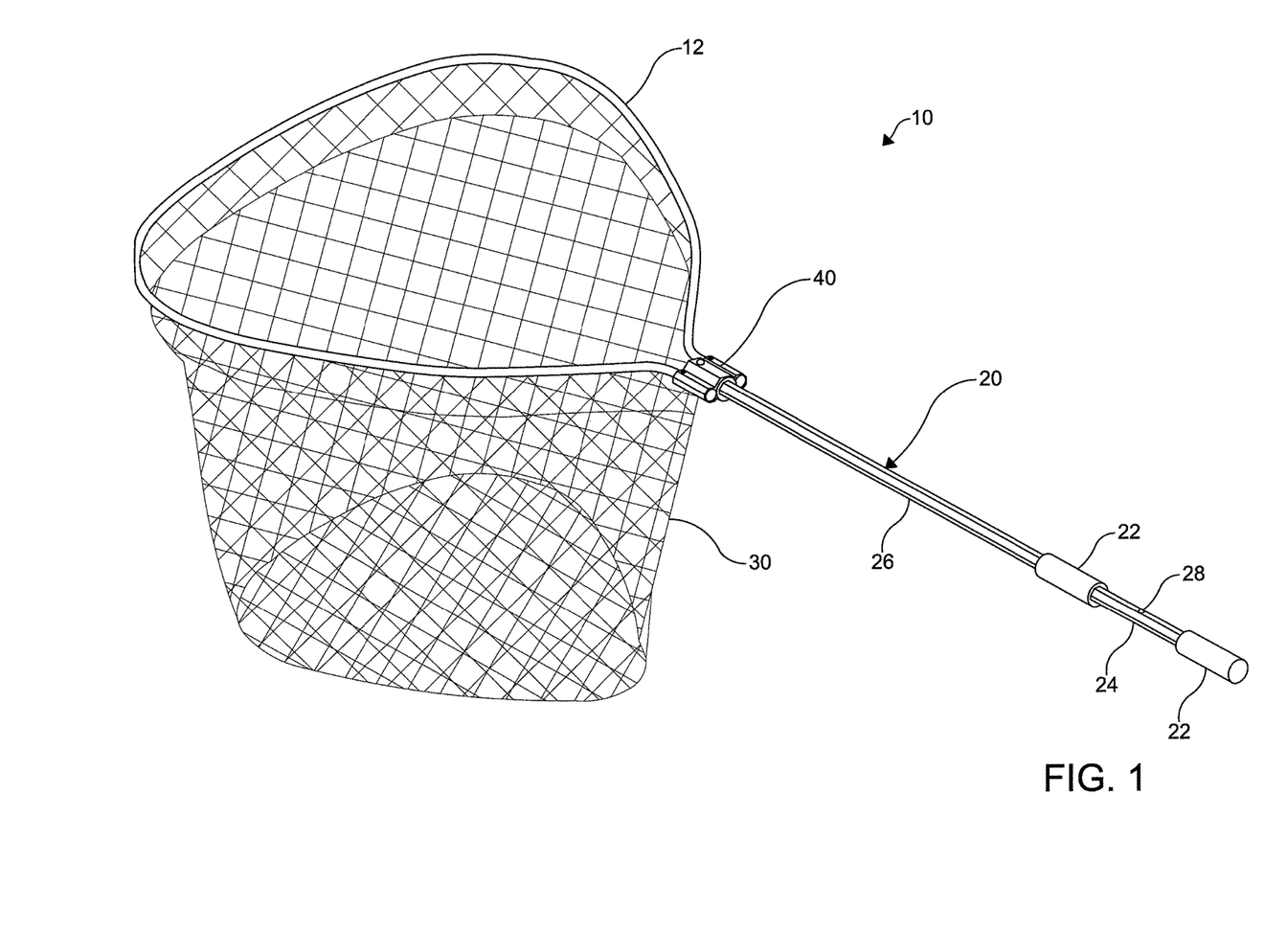
FIG. 1 is a perspective view of a fishing net in accordance with an embodiment of the invention.

FIG. 1 shows a fishing net 10 in accordance with an embodiment of the invention. The fishing net 10 includes a generally annular frame or hoop 12 secured at a proximal portion 14 thereof to one end of a rigid, elongate handle 20. The hoop 12 supports a net bag 30 having an open top around the periphery of which the hoop 12 extends, and which may be loosely connected to the hoop 12 as by means of loops in the net bag 30 or any other suitable means. The net bag 30 may be of any suitable open mesh construction and of any suitable material, such as nylon or the like.

The handle 20 may be of conventional construction and may include one or more hand grips 22 to facilitate grasping by a user. The handle 20 may optionally be extendable, as illustrated in FIG. 1, formed with a first tube 24 that extends within a second tube 26 in a telescoping manner, as is known. As is also known, a ball detent mechanism 28 may be provided to selectively hold the first tube 24 in a fixed position relative to the second tube 26. The handle 20 may be formed of any material with a sufficiently high strength to weight ratio, such as an aluminum alloy, fiber-glass, a composite or the like. An aluminum alloy is preferred. The end of the handle 20 opposite the hoop 12 may optionally be provided with a T-shaped handle (not shown) to aid the user in controlling rotational movement of the handle 20 about its longitudinal axis.

Figure 2:
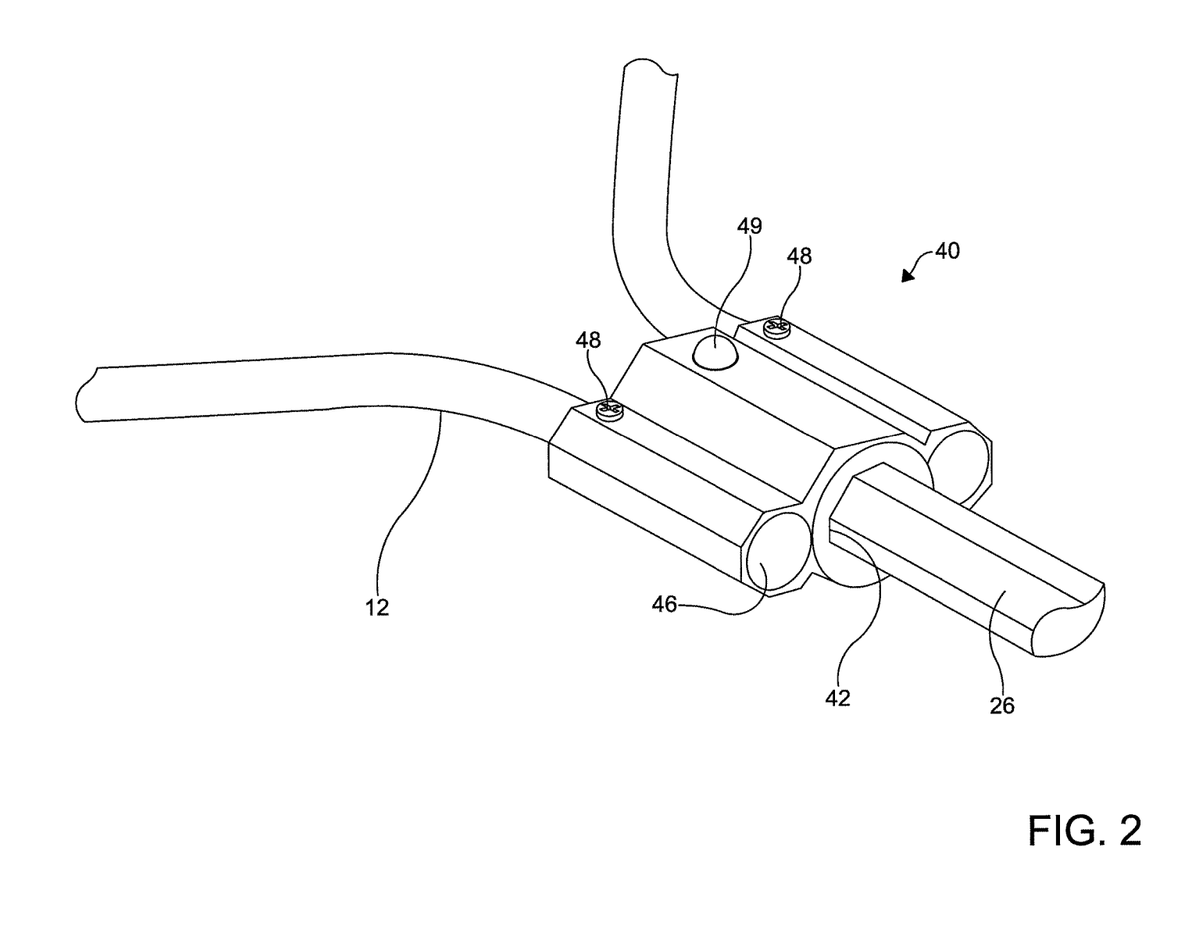
FIG. 2 is an enlarged, perspective view of a portion of the fishing net of FIG. 1 without the net bag.

The hoop 12 may be secured to the end of the handle 20 in any suitable manner. In the illustrated embodiment, the hoop 12 is secured to the handle 20 by a yoke 40. As best seen in FIG. 2, the yoke 40 includes a main sleeve 42 in which the end of the second tube 26 of the handle 20 is received. The end of the second tube 26 may be secured within the main sleeve 42 by any suitable means, such as for example the ball detent mechanism 49 illustrated. The yoke 40 further includes a pair of secondary sleeves 46, one on either side of the main sleeve 42, for receiving the two ends of the hoop 12. The ends of the hoop 12 may be secured within the sleeves 46 by any suitable means, such as by the illustrated threaded fasteners 48.

The hoop 12 of the fishing net 10 of the invention is hollow, being formed of a section of tubing bent to generally annular or loop-like configuration to define a net opening for receiving a fish into the net bag 30. The section of tubing may be formed from any suitable material having a sufficiently high strength to weight ratio, such as an aluminum alloy, fiber-glass, a composite or the like. An aluminum alloy is preferred.

In an embodiment, each end of the section of tubing 7 forming the hoop 12 terminates in a straight tail 50, 52. In that case, it is the tails 50, 52 that are received in the sleeves 46 of the yoke 40 such that the tails 50, 52 are adjacent and substantially parallel to one another. This in effect closes the proximal portion of the hoop 12; that is, the portion of the hoop 12 at which the handle 20 is attached.

Figure 3:
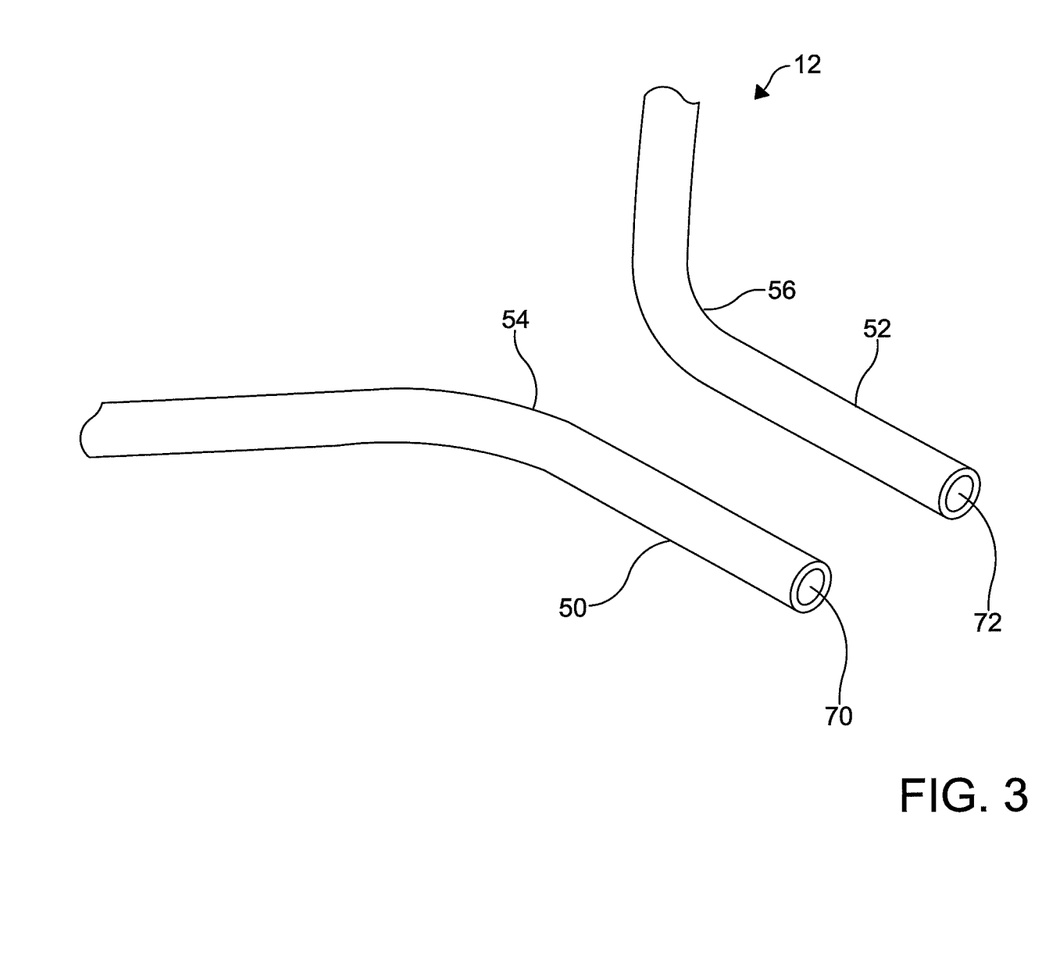
FIG. 3 is an enlarged, perspective view of the proximal portion of the hoop of the fishing net of FIG. 1.
Figure 4:
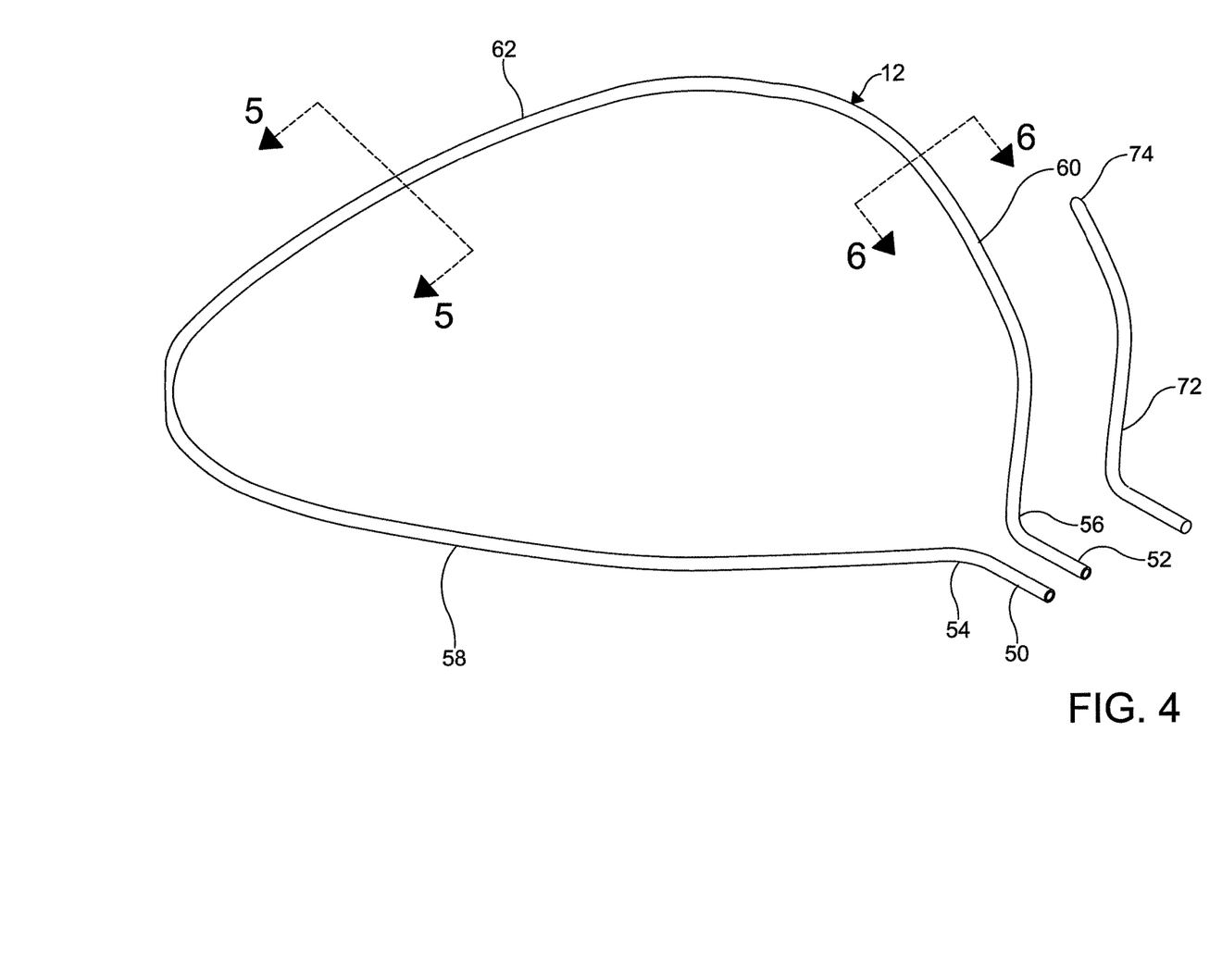
FIG. 4 is an exploded perspective view of the hoop and one of the two reinforcing rods.

As best illustrated in FIGS. 3 and 4, from the straight tails 50 and 52, each end of the hoop 12 is bent in a first curve 54, 56 away from one another. Then, as shown in FIG. 4, each end of the hoop 12 extends through a second curve 58, 60, such that the respective first and second curves define respective S-shaped sections in the ends of the hoop 12 extending from the tails. At a distal portion of the hoop 12, between the two S-shaped end portions, the hoop 12 defines a midsection 62. The hoop is formed with a cross-sectional profile that varies along at least a portion of the length of the section of tubing.

Figure 5:
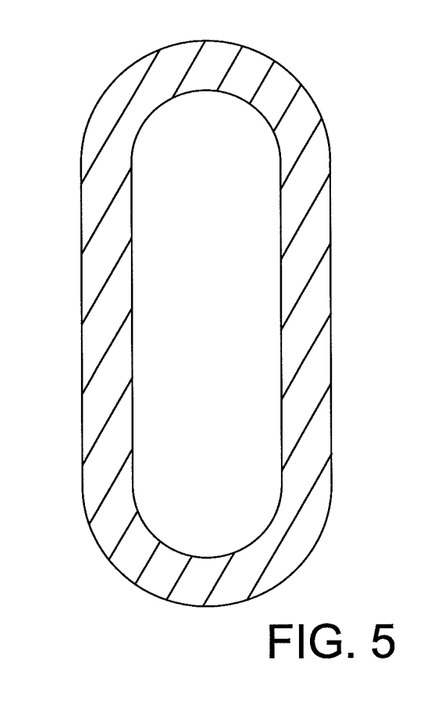
FIG. 5 is an enlarged, cross-sectional view taken along line 5-5 of FIG. 4.

In an embodiment, the cross-sectional profile of the hoop 12 varies from the proximal portion of the hoop to a distal portion 62 of the hoop 12. Preferably, the cross-sectional profile at the proximal portion of the hoop 12 is more circular in shape than the cross-sectional profile at the distal portion 62 of the hoop 12. In the illustrated embodiment, the hoop 12 can be seen to generally define a plane, although of course not all portions of the 12 need lie strictly within such plane. In a preferred embodiment, the cross-sectional profile at the distal portion of the hoop 12 is generally oval in shape, being of greater dimension in a direction perpendicular to the plane generally defined by the hoop 12 than in a direction parallel with the plane generally defined by the hoop 12. The cross-sectional profile of the distal portion 62 is preferably elliptical or obround. In an especially preferred embodiment, shown in FIG. 5, the cross-sectional profile at the distal portion 62 of the hoop 12 is obround.

Figure 6:
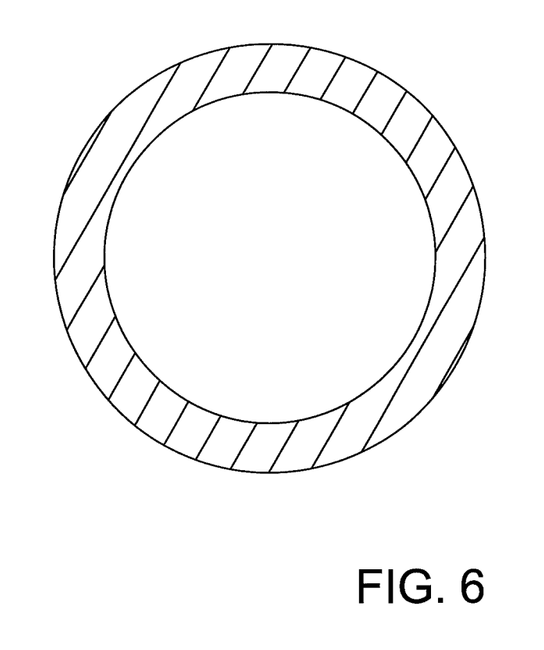
FIG. 6 is an enlarged, cross-sectional view taken along line 6-6 of FIG. 4.

In further preferred embodiment, shown in FIG. 6, the cross-sectional profile at the proximal portion of the hoop 12 is circular. That is, in this embodiment, the cross-sectional profile is circular at both tails 50, 52 and extending through both S-shaped portions.

A pair of reinforcing rods 70, 72 are provided, one positioned within each end of the section of tubing forming the hoop 12. Preferably, there is no reinforcing rod positioned within the section of tubing comprising the distal portion or midsection 62 of the hoop 12. The reinforcing rods 70, 72 are preferably solid and formed of a material with a relatively high strength to weight ratio, such as an aluminum alloy, fiber-glass, a composite or the like. An aluminum alloy is preferred.

In FIG. 4, the hoop 12 is shown with one of the reinforcing rods 72 outside of the tubing. The other reinforcing rod 70 is not shown, but would be a mirror image of the reinforcing rod 72. As shown in FIG. 4, the reinforcing rods are shaped to match the shape of the ends of the hoop 12 through the respective S-shaped portions. The ends of the reinforcing rods 70, 72 may be flush with the respective ends of the tails 50, 52, as shown in FIG. 3. The opposite ends of the reinforcing rods 70, 72 preferably terminate in a tapered end (end 74 of rod 72 being shown in FIG. 3).

In a further aspect of the invention, a method of forming a hoop for a fishing net is provided. According to an embodiment of the method, a section of tubing is provided that defines first and second end sections and a midsection therebetween, the section of tubing being of a circular cross-sectional profile. The midsection is shaped to have a non-circular cross-sectional profile, preferably in gradual transitions. Such transitions may typically be on the order of 4 to 6 inches long (although the invention is not limited thereby) and may be formed via a series of steps to achieve a smooth transition with no stress concentrations or abrupt changes in the wall thickness of the tubing. The shaping can be performed by any suitable process. Preferably, the midsection is shaped in a roll-forming process. Moreover, the midsection is preferably shaped to have a cross-sectional profile that is generally oval, preferably elliptical or obround, and most preferably obround. The midsection may be bent to form a portion of the hoop before being shaped to have the non-circular cross-sectional profile.

A first reinforcing rod is positioned in the first end section of the tubing and a second reinforcing rod is positioned in the second end section of the tubing. Then, the section of tubing and the reinforcing rods are bent such that the section of tubing forms a hoop with the first end section adjacent to the second end section. Both a handle and a net bag may be secured to the hoop, as is known.

The fishing net 10 with hoop 12 in accordance with the invention provides a fishing net of significantly reduced weight relative to its size and which is relatively inexpensive to manufacture. The more circular cross-sectional profile of the tubing appears at the proximal portion of the hoop, where it was discovered the stresses are multi-directional, depending upon the orientation of the hoop, and most severe. The preferred circular cross-sectional profile provides the most strength in multiple directions, and the strength of the hoop is preferably augmented at the proximal portion with the reinforcing rods.

Then, past the S-shaped end portions of the tubing and the ends of the reinforcing rod, the cross-sectional profile of the tubing transitions to one that is non-circular, preferably generally oval, more preferably elliptical or obround, and most preferably obround, with the major axis oriented perpendicular to the plane generally defined by the hoop. This orientation provides for increased strength, perhaps about twice the strength, in regard to a bending moment perpendicular to the plane of the hoop, which is the second highest strain when the net assembly is used to lift the fish. The most preferred obround profile in the midsection also provides for the least drag and visibility as the net is presented to the fish.

In embodiments in which the reinforcing rods extend through the first two curves in the hoop, the resulting torsional loads on the distal portion of the hoop are reduced, allowing for the use of lighter/thinner walled tubing to be used to form the hoop. This in turn reduces the weight of the hoop at the distal end which has a significant positive affect on the balance and user comfort of the entire net assembly. Where the reinforcing rods terminate in tapered ends, the stress concentrations in the tubing where the relatively stiff rods end are significantly reduced.

According to various aspects of various embodiments of the invention:

1. The fishing net of the invention enables large nets to be fabricated that are both strong and light weight. Since stresses on a fishing net hoop vary significantly depending on the section of the hoop, the cross sectional profiles and any reinforcement preferably change accordingly in order to minimize weight and cost.
2. The vertical stresses (with the hoop parallel to the earth's surface) are greatest due to the two hoop tails (inserted into the yoke) being on the same plane relative to the axis of the load. In order to keep the diameter of the tubing small and thus reduce weight and drag in the water, a high strength reinforcing rod is inserted into the relatively weaker tubing and extended just far enough to support the design loads. Using this for only a portion of the hoop keeps the weight and cost low.
3. The horizontal stresses (with the hoop rotated 90 degrees about the axis of the handle from parallel to the earth's surface) at the bends closest to the yoke are carried primarily by the reinforcing rods. This orientation spreads the moment arm between the two hoop tails (end inserted into the yoke), but puts greater stresses on the bends nearest the yoke. The reinforcing rods extend past the first bends or curves, thus carrying the loads (parallel to the plane of the hoop) and reducing the tension stresses on the weaker tubing.
4. Where the high strength reinforcing rods extend past the first two bends or curves, they carry the torsional loads (relative to the axis of the handle) and reduce the torsional shear stresses on the relatively weaker tubing. This extension of the high strength rod past the first two bends/curves allows a weaker/lighter tubing to be used at the distal portion (or near the apex) of the hoop.
5. Where a circular cross-sectional profile of the proximal portion of the hoop nearest the yoke is transitioned to an oval or even obround shape at the midsection of the hoop, with the longer oval or obround axis perpendicular to the plane of the hoop, the moment arm is increased in the axis perpendicular to the plane of the hoop while also reducing the frontal area, which reduces visibility and water drag as the net is presented to a fish. This allows for the use of relatively weaker/lighter material for forming the hoop.
6. Where the distal ends of the reinforcing rods are tapered, concentrated stresses are reduced where the high strength inner rods end.
7. Where the portion of the hoop most distal from the handle is the lightest, the balance of the net is improved. The heaviest/strongest portion of the hoop is nearest the handle, where the greatest strength is required and the weight is least noticed by the user.

In accordance with the provisions of the patent statutes, the invention has been described in what is considered to represent its preferred embodiments. However, it should be noted that the invention could be practiced otherwise than as specifically illustrated and described without departing from its spirit or scope.

What is claimed:

1. A fishing net comprising:
   a hoop formed of a section of tubing bent to a loop-like configuration, the hoop defining a net opening;
   an elongate handle secured to the hoop at a proximal portion of the hoop; and
   a net bag supported on the hoop;
   wherein the hoop is hollow and is formed with a cross-sectional profile that varies in shape along at least a portion of the length of the section of tubing.

2. The fishing net of claim 1, wherein the cross-sectional profile of the hoop varies from the proximal portion of the hoop to a distal portion of the hoop.

3. The fishing net of claim 2, wherein the cross-sectional profile at the proximal portion of the hoop is more circular in shape than the cross-sectional profile at the distal portion of the hoop.

4. The fishing net of claim 3, wherein the hoop defines a plane and the cross-sectional profile at the distal portion of the hoop is generally oval in shape, being of greater dimension in a direction perpendicular to the plane defined by the hoop than in a direction parallel with the plane defined by the hoop.

5. The fishing net of claim 4, wherein the cross-sectional profile at the proximal portion of the hoop is circular.

6. The fishing net of claim 4, wherein the cross-sectional profile at the distal portion of the hoop is obround.

7. The fishing net of claim 4, wherein the cross-sectional profile at the distal portion of the hoop is elliptical.

8. The fishing net of claim 2, wherein the proximal portion of the hoop is comprised of each end of the section of tubing, and a reinforcing rod is positioned within each end of the section of tubing, while no reinforcing rod is positioned within the section of tubing comprising the distal portion of the hoop.

9. The fishing net of claim 8, wherein each end of the section of tubing includes an S-shaped portion extending from a first curve to a second curve, and each reinforcing rod extends within the respective end of the section of tubing through the S-shaped portion.

10. The fishing net of claim 9, wherein each end of the section of tubing terminates in a straight tail, the tails being adjacent and substantially parallel to one another, and each reinforcing rod extending within the respective tail.

11. The fishing net of claim 8, wherein each reinforcing rod is formed of high strength aluminum alloy.

12. The fishing net of claim 8, wherein each reinforcing rod terminates in a tapered end.

13. A fishing net comprising a hoop formed with a variable cross-sectional profile and a net supported on the hoop.

14. A method of forming a hoop for a fishing net, comprising:
   providing a section of hollow tubing defining first and second end sections and a midsection therebetween, the section of tubing being of a circular cross-sectional profile;
   shaping the midsection to have a non-circular cross-sectional profile, so that the cross-sectional profile of both the first and second end sections are more circular in shape than the cross-sectional profile of the midsection;

positioning a first reinforcing rod in the first end section and a second reinforcing rod in the second end section; and bending the section of tubing and the reinforcing rods such that the section of hollow tubing forms a hoop with the first end section adjacent to the second end section.

15. The method of claim 14, wherein the midsection is shaped by roll-forming.

16. The method of claim 14, wherein the midsection is bent to form a portion of the hoop before being shaped to have a non-circular cross-sectional profile.

* * * * *